US012754567B2

(12) United States Patent
Morioka et al.

(10) Patent No.: US 12,754,567 B2
(45) Date of Patent: Oct. 6, 2026

(54) SYSTEM AND METHOD FOR CUSTOMIZING NOISE ABATEMENT DEPARTURE PROCEDURES

(71) Applicant: HONEYWELL INTERNATIONAL INC., Charlotte, NC (US)

(72) Inventors: Yuta Morioka, Seattle, WA (US); Martin Jezek, Brno (CZ); Michael Mast, Phoenix, AZ (US)

(73) Assignee: Honeywell Aerospace US LLC, Phoenix, AZ (US)

( * ) Notice: Subject to any disclaimer, the term of this patent is extended or adjusted under 35 U.S.C. 154(b) by 140 days.

(21) Appl. No.: 18/753,336

(22) Filed: Jun. 25, 2024

(65) Prior Publication Data

US 2025/0390110 A1 Dec. 25, 2025

(51) Int. Cl.

| | |
|---|---|
| ***G05D 1/652*** | (2024.01) |
| ***B64D 45/00*** | (2006.01) |
| ***G05D 1/65*** | (2024.01) |
| ***G05D 109/20*** | (2024.01) |
| ***G08G 5/21*** | (2025.01) |
| ***G08G 5/24*** | (2025.01) |
| ***G08G 5/32*** | (2025.01) |
| ***G08G 5/52*** | (2025.01) |
| ***G08G 5/55*** | (2025.01) |
| ***G08G 5/59*** | (2025.01) |

(52) U.S. Cl.

CPC ............. *G05D 1/652* (2024.01); *B64D 45/00* (2013.01); *G05D 1/65* (2024.01); *G08G 5/21* (2025.01); *G08G 5/24* (2025.01); *G08G 5/32* (2025.01); *G08G 5/52* (2025.01); *G08G 5/55* (2025.01); *G08G 5/59* (2025.01); *G05D 2109/20* (2024.01)

(58) Field of Classification Search

CPC ...... G05D 1/652; G05D 1/65; G05D 2109/20; B64D 45/00; G08G 5/21; G08G 5/24; G08G 5/32; G08G 5/52; G08G 5/55; G08G 5/59

See application file for complete search history.

(56) References Cited

U.S. PATENT DOCUMENTS

| | | | | |
|---|---|---|---|---|
| 8,670,881 | B2 | 3/2014 | Dejonge | |
| 9,483,052 | B2 | 11/2016 | Mcgregor et al. | |
| 9,493,249 | B2 | 11/2016 | Shukla | |
| 9,696,724 | B1 * | 7/2017 | Arons | G05D 1/0661 |
| 11,305,886 | B1 * | 4/2022 | Gilbert | G06F 3/04847 |

(Continued)

*Primary Examiner* — Kito R Robinson
*Assistant Examiner* — Zachary E. F. Glade
(74) *Attorney, Agent, or Firm* — Ingrassia Fisher & Lorenz

(57) ABSTRACT

An aircraft system comprises at least one display device within an aircraft, a flight management system (FMS), at least one user interface, and processor circuitry forming at least one processor communicatively coupled to the display device, the FMS, and the user interface. The at least one processor is arranged to operate by displaying, prior to take-off while the aircraft is on the ground, at least one noise abatement departure procedure (NADP) page, where the NADP page has at least one input field arranged to receive an NADP parameter value from a user after display of the at least one input field. The NADP page displays an indication of an NADP parameter type to be entered into the at least one input field. The processor also is arranged to operate by loading the NADP parameter value as part of a customized NADP into the FMS.

20 Claims, 10 Drawing Sheets

(56) References Cited

U.S. PATENT DOCUMENTS

| | | | | |
|---|---|---|---|---|
| 11,733,712 | B2 | 8/2023 | Gurusamy et al. | |
| 2008/0114503 | A1 | 5/2008 | Burnside | |
| 2011/0118908 | A1 * | 5/2011 | Boorman ................. | G08G 5/55<br>701/14 |
| 2013/0092791 | A1 | 4/2013 | Bakker et al. | |
| 2022/0004202 | A1 * | 1/2022 | Gurusamy ............... | G08G 5/32 |

* cited by examiner

FIG. 4
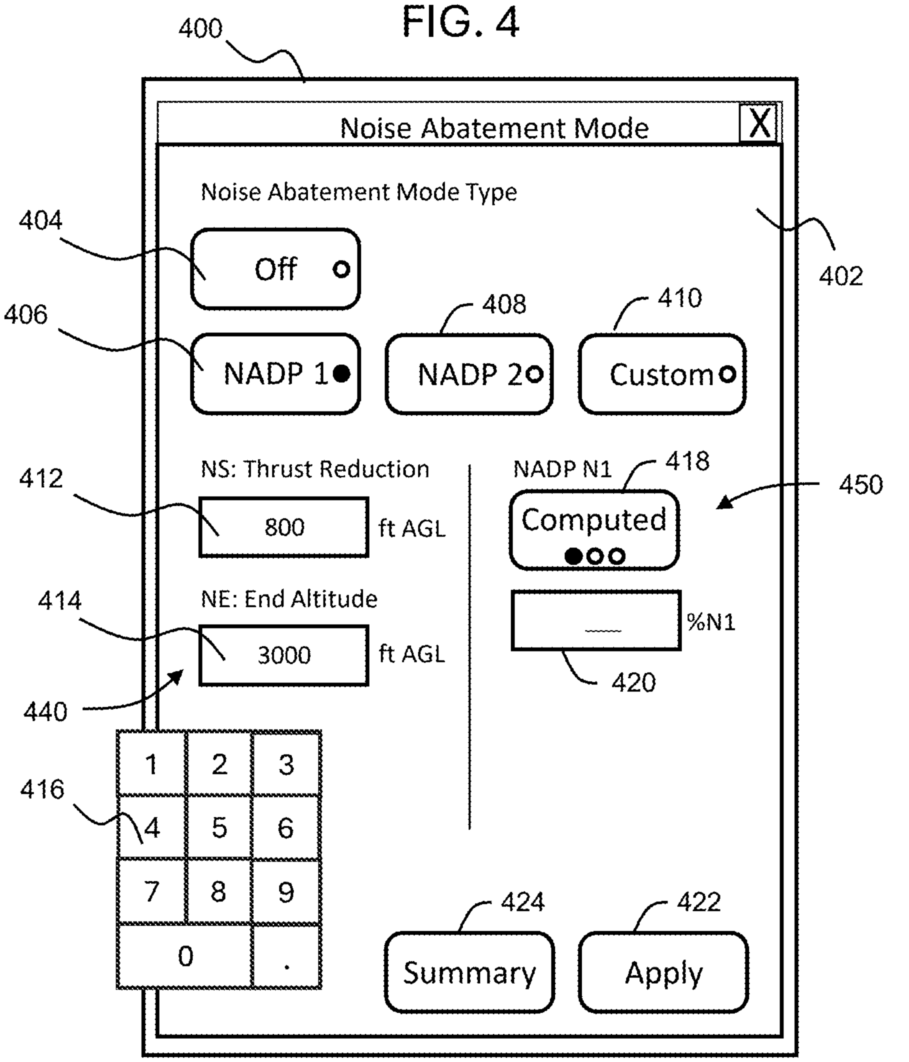
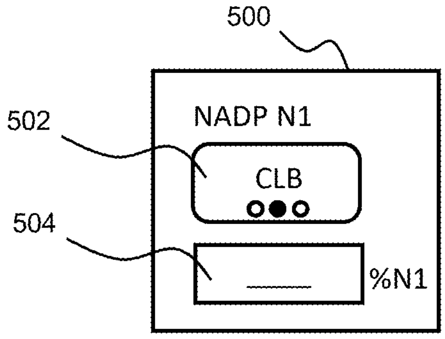
FIG. 5
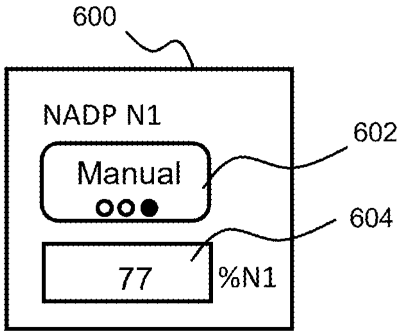
FIG. 6

FIG. 7
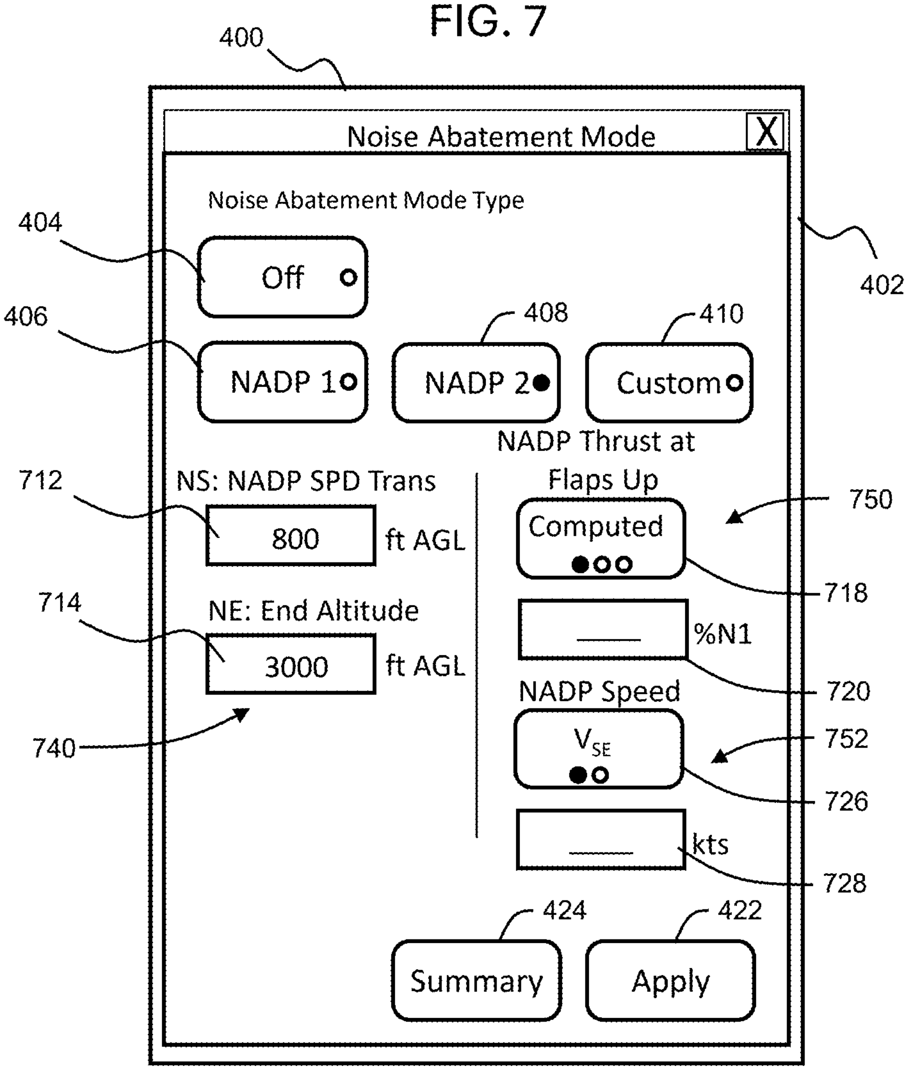
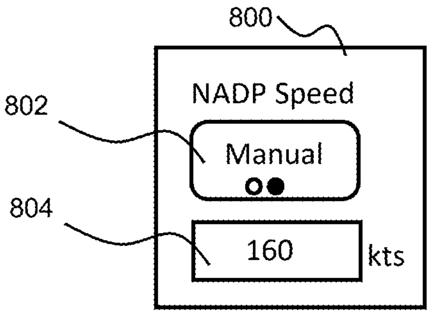
FIG. 8

FIG. 9
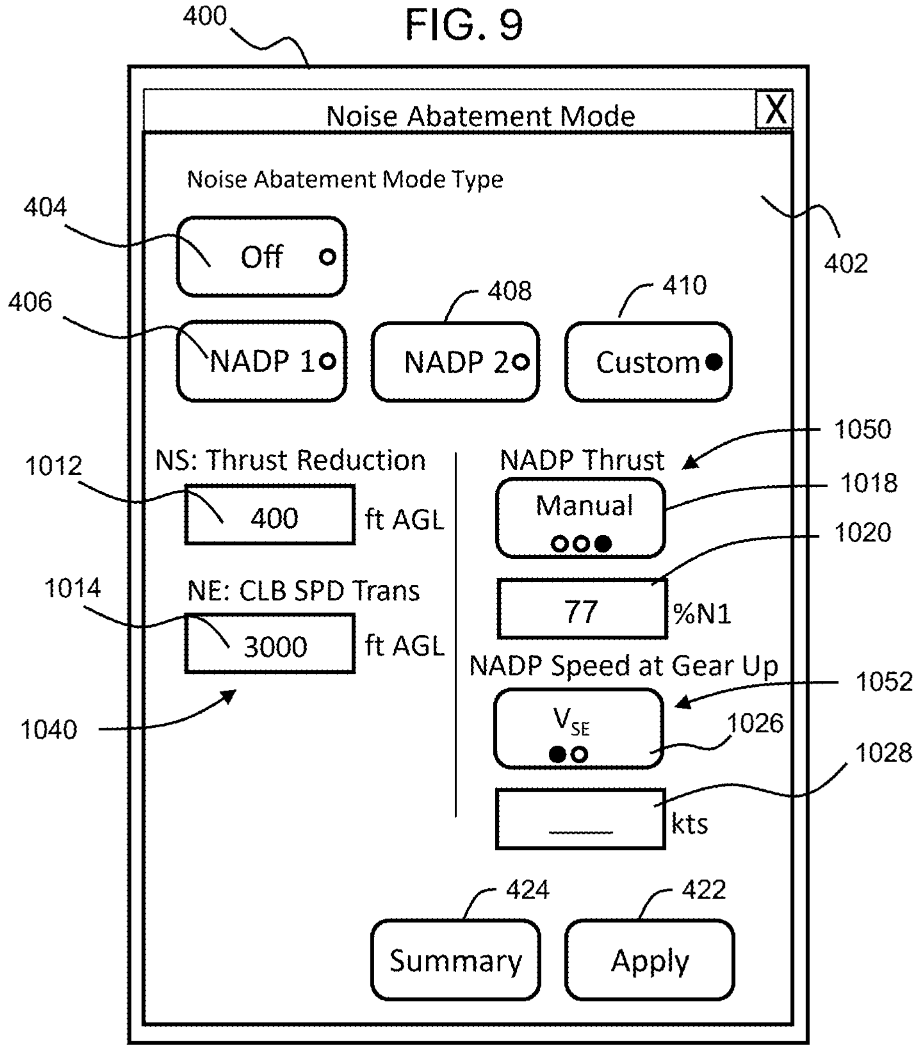
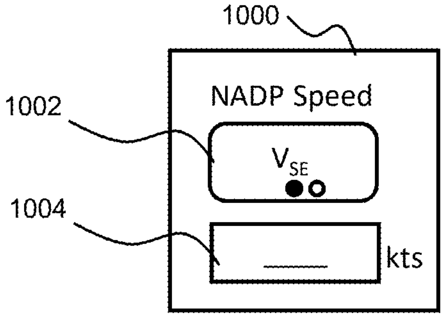
FIG. 10
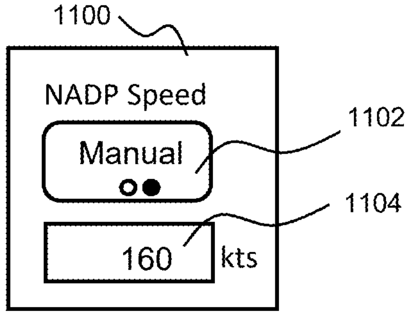
FIG. 11

SYSTEM AND METHOD FOR CUSTOMIZING NOISE ABATEMENT DEPARTURE PROCEDURES

TECHNICAL FIELD

The present disclosure generally relates to methods and systems for generating and displaying aircraft flight plans, and particularly for generating and displaying customizable noise abatement departure procedures (NADPs).

BACKGROUND

During takeoff or departure procedures, aircraft may generate excessive noise due to engine thrust, vibrations, and other reasons. Noise disturbance can have significant adverse effects on people or environments relatively close to air traffic, such as those living close to an airport. To address the noise concerns, aviation organizations have issued noise certification standards, and this includes standard NADPs. The standard NADPs are often modified because different vertical profile parameters, such as different speeds, thrusts, and altitudes, of the NADP may change depending on the geographical location of an aerodrome and other factors. Thus, the NADP may change from airport to airport, often requiring the pilot to manually change the NADP data in a cumbersome process that makes it difficult to track and review the changes, and automate the modified NADP. Hence, it is desirable to permit an aircrew to graphically customize an NADP that accounts for various modifications or replacement of the standard NADPs.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

An aircraft system disclosed herein includes at least one display device within an aircraft, a flight management system (FMS), at least one user interface, and processor circuitry forming at least one processor communicatively coupled to the display device, the FMS, and the user interface. The at least one processor is arranged to operate by displaying, prior to take-off while the aircraft is on the ground, at least one noise abatement departure procedure (NADP) page, where the NADP page has at least one input field arranged to receive an NADP parameter value from a user after display of the at least one input field. The NADP page displays an indication of an NADP parameter type to be entered into the at least one input field. The processor is also arranged to operate by loading the NADP parameter value as part of a customized NADP into the FMS.

A method disclosed herein includes displaying on a display device onboard an aircraft, prior to take-off while the aircraft is on the ground, at least one noise abatement departure procedure (NADP) page, where the displaying comprises displaying at least one input field on the NADP page arranged to receive an NADP parameter value from a user after display of the at least one input field; displaying an indication of an NADP parameter type to be entered into the at least one input field on the NADP page. The method also includes receiving the NADP parameter value from a user via an interface that provides the NADP parameter value to be entered into the at least one input field; and loading the NADP parameter value as part of a customized NADP into the FMS.

An aircraft disclosed herein includes at least one display device within the aircraft, a flight management system (FMS), at least one user interface, and processor circuitry forming at least one processor communicatively coupled to the at least one display device, the FMS, and the at least one user interface. The at least one processor is arranged to operate by: displaying, prior to take-off while the aircraft is on the ground, at least one noise abatement departure procedure (NADP) page, where the NADP page has at least one input field arranged to receive an NADP parameter value from a user after display of the at least one input field. The NADP page displays an indication of an NADP parameter type to be entered into the at least one input field, and loading the NADP parameter value as part of a customized NADP into the FMS.

Furthermore, other desirable features and characteristics will become apparent from the subsequent detailed description and the appended claims, taken in conjunction with the accompanying drawings and the preceding background.

BRIEF DESCRIPTION OF THE DRAWINGS

A more complete understanding of the subject matter may be derived from the following detailed description taken in conjunction with the accompanying drawings, where like reference numerals denote like elements, and:

FIG. 4 is a schematic diagram of a noise abatement mode page set for NADP1 and to input and/or display an automatically computed NADP N1-based thrust according to at least one of the implementations disclosed herein;

FIG. 5 is a schematic diagram of an alternative NADP N1-based thrust input field for the noise abatement page of FIG. 4 according to at least one of the implementations disclosed herein;

FIG. 6 is a schematic diagram of another alternative NADP N1-based thrust input field for the noise abatement page of FIG. 4 according to at least one of the implementations disclosed herein;

FIG. 7 is a schematic diagram of the noise abatement mode page of FIG. 4 set for NADP2 and to input and/or display an automatically computed NADP N1-based thrust and an NADP speed according to at least one of the implementations disclosed herein;

FIG. 8 is a schematic diagram of an alternative NADP speed input field for the noise abatement page of FIG. 7 according to at least one of the implementations disclosed herein;

FIG. 9 is a schematic diagram of the noise abatement page of FIG. 4 set for a Custom NADP and to input and/or display an NADP thrust and an NADP speed at gear up according to at least one of the implementations disclosed herein;

FIG. 10 is a schematic diagram of an alternative NADP speed input field for the noise abatement page of FIG. 9 according to at least one of the implementations disclosed herein;

FIG. 11 is a schematic diagram of another alternative NADP speed input field for the noise abatement page of FIG. 9 according to at least one of the implementations disclosed herein;

DETAILED DESCRIPTION

Figure 1:
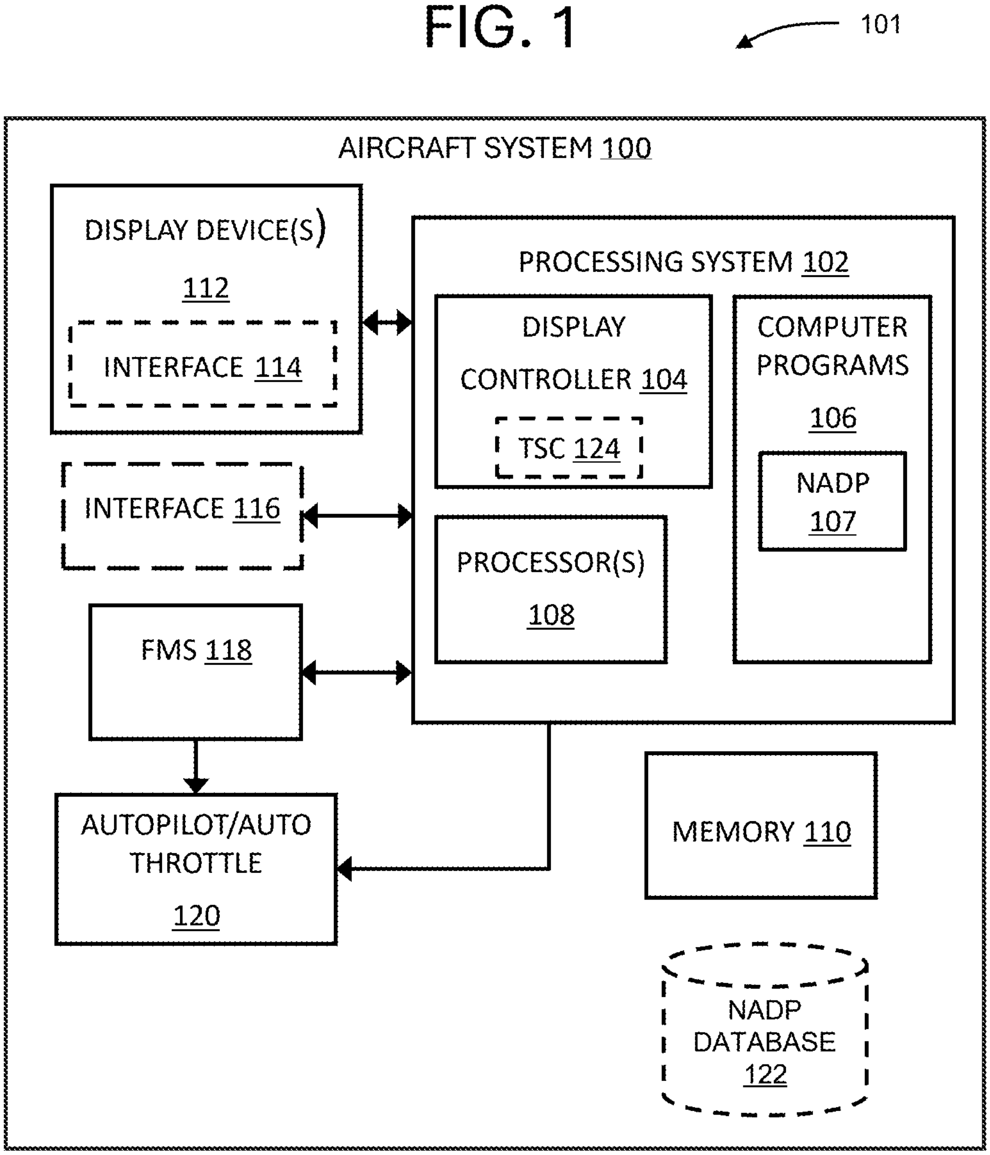
FIG. 1 is a schematic diagram of a system for generating displays to receive customized parameter input of NADPs according to at least one of the implementations disclosed herein.

The following detailed description discloses examples implementations and is not intended to limit the application and uses. Furthermore, there is no intention to be bound by any expressed or implied theory presented in the preceding technical field, background, summary, or the following detailed description.

The standard NADPs (such as NADP1 or NADP2) often need to be modified or replaced because particular aerodromes often require different NADPs depending on location specific regulations as well as which airport, aircraft, and/or airline carrier is being used. However, the flight management system (FMS) often provides the option to select between NADP1 or NADP2 with no other choices presented. Also, the FMS may not have pages to enter certain NADP parameters at all. For example, the modified NADPs often require entry of a reduced NADP thrust setting, and the typical FMS display pages do not provide a place to enter such a reduced thrust. In this case, the pilot is either limited to the standard thrust levels, or the pilot must control the plane manually to perform a modified thrust level. Note that the terms thrust level, thrust amount, thrust value, and thrust setting are used interchangeably herein.

Thus, systems and methods disclosed herein provide NADP parameter entry displays to view and customize NADPs in a way that reduces flight crew workload, increases safety, and permits autopilot execution of the customized NADP. The present system and method permits the pilot to easily modify the NADP parameters such as altitude, speed, and thrust targets and to view the resulting NADP plan. In some implementations, a Noise Abatement Mode (NAM) page is provided on a cockpit display to select among the available NADP standards or a custom mode to enter various NADP parameters. Also, an NADP Setup Summary (NSS) page that is a vertical profile summary display shows a vertical profile of an NADP with input fields or windows for the pilot to customize the NADP parameters directly on the NSS page. The NAM page and the graphical NSS page both may be interactive and have touch screens for the flight crew to enter NADP parameters directly into NADP data input fields on the displays. The NAM and NSS pages may be used before a flight while an aircraft is still on the ground before takeoff, and while the flight crew is planning a customized NADP. Thus, the NADP pages can display a vertical NADP profile that can be fully customized, without limitation to the standard NADP1 and 2 when desired, and which then can be fully automated with custom NADP parameters such as speed and thrust levels.

The NADP-related displays provide NADP parameter entry locations to have an autopilot and/or autothrottle perform the customized NADP including to reduce thrust to an NADP thrust level as needed. Furthermore, other desirable features and characteristics of the present implementations will become apparent from the subsequent detailed description and the appended claims, taken in conjunction with the accompanying drawings and the foregoing technical field and background.

The International Civil Aviation Organization (ICAO) is one organization that provides the noise certification standards, which are detailed in ICAO Annex 16: Environmental Protection, Volume 1—Aircraft Noise publication. Since 1977, any new aircraft have been required to meet stricter (Chapter 3) or later standards. From 1 Jan. 2006, a more stringent standard (Chapter 4) has been applied for new aircraft. The standards provide an NADP1 or 'close-in' procedure, which alleviates noise close to an aerodrome, such as a land location from which flight operations take place including any part of an airport. The standards also provide an NADP2 or 'distant' procedure, which alleviates noise more distant from the aerodrome.

NADPs incorporate noise abatement procedures as part of the takeoff roll and climb. One example NADP for reference includes the following operations:

a. Set Takeoff Power and Flaps Climbing at speed V2 plus to 800 feet (for example) altitude, b. At 800 feet altitude, set reduced Climb Power for noise abatement, Retract Flaps, Reduce Pitch.

c. Operate Constant Speed Climb to 3000 feet (for example) altitude, d. At 3000 feet altitude, increase power and accelerate to en-route climb speed.

Generally, NADPs include reduced engine thrust during takeoff after the aircraft reaches a predetermined altitude above ground and the engine thrust is restored to (about) full power after climbing to a higher predetermined altitude. In this way, engine noise at ground level is markedly reduced as compared to that which occurs during a full-thrust climbing maneuver.

Referring to FIG. 1, an aircraft system 100 of an aircraft 101 can provide NADP displays to input customized NADP parameters as described herein. The aircraft system 100 includes a processing system 102, a memory 110, at least one display device 112 that may have an interface 114 such as a touchscreen, optionally other interfaces 116, an FMS 118, an autopilot and/or auto-throttle unit 120, and optionally an NADP database 122.

It will be understood that aircraft system 100 is a simplified representation of an aircraft system and is not intended to limit the application or scope of the subject matter disclosed herein in any way. In practice, the aircraft system 100 will include numerous other devices and components for providing additional functions and features, as will be appreciated in the art.

In implementations, no limit exists as to the type of aircraft that has the system 100, and such an aircraft can be a multicopter (or rotary-wing), fixed-wing, or tilt-wing aircraft. The aircraft can be an airplane or a helicopter or other aircraft with powered rotors, such as cyclogyros/cyclocopters and tiltrotors. The aircraft may be fully electric, or hybrid powered and can include jet engines or propellers. The aircraft may be a VTOL (Vertical Take-Off and Landing) or eVTOL (electric VTOL).

It also will be understood that while by one form, the entire system 100 is onboard a single aircraft, in other forms, one or more components of the system 100 may be remote from the aircraft, such as at a cloud server and so forth, as long as a display device and interface to be used as described herein are accessible to an aircrew before a flight and by one form, during the flight as well. It also will be understood that any communicative coupling between the components of system 100 may be by wired connection or remote (or wireless connection or network), as understood in the art.

In implementations, the aircraft system 100 includes an autopilot and/or auto-throttle unit 120. An autopilot unit 120 automates tasks such as maintaining an altitude, climbing or descending to an assigned altitude, turning to and maintaining an assigned heading, intercepting a course, guiding the aircraft between waypoints that make up a route programmed into the FMS 118, and flying a precision or nonprecision approach. The autopilot unit 120 may include a set of servo actuators that execute the control movement and the control circuits to make the servo actuators move the correct amount for the selected task. The autopilot unit 120 further includes a flight director (FD), which provides computational power to accomplish flight tasks including receiving navigational data, FMS data, environmental data, selected autopilot and data from other data sources, and calculates the commands needed to operate the aircraft as desired. Most flight directors accept data input from an air data computer (ADC), Attitude Heading Reference System (AHRS), navigation sources, the pilot's control panel, and the autopilot servo feedback, to name some examples.

An auto-throttle (automatic throttle, also known as autothrust, A/T) is a system of the autopilot/auto throttle unit 120 that allows a pilot to control the power setting of an aircraft's engines by specifying a desired flight characteristic, rather than manually controlling the fuel flow. The auto-throttle can greatly reduce the pilots' workload and help conserve fuel and extend engine life by metering the precise amount of fuel required to attain a specific target indicated air speed, climb speed, or the assigned power for different phases of flight. In a speed mode of the auto-throttle, the throttle is positioned to attain a set target speed. This mode controls aircraft speed within safe operating margins. In a thrust mode of the auto-throttle, the engine is maintained at a fixed power setting according to a particular flight phase. For example, during takeoff, the A/T maintains constant takeoff power until takeoff mode is finished. During climb mode, the A/T maintains constant climb power; and so on. When the A/T is working in thrust mode, speed is controlled by pitch (or the control column), and not by the A/T. The autopilot and auto-throttle unit 120 can work together to fulfill most, if not all, of the flight plan. NADP display pages described herein provide images with fields or windows to input thrust levels that can be executed by the auto-throttle and/or autopilot. Otherwise, the autopilot and auto-throttle unit 120 receives FMS data and determines throttle and mode settings on a schedule according to a flight plan based at least partly on the FMS data.

In various implementations, the FMS 118, in cooperation with a navigation system (not shown) and a navigation database (not shown), provides pre-flight and real-time flight guidance for the aircraft with aircraft system 100. A flight management controller (or computer) (FMC) may operate the FMS 118. Thus, the FMS 118 provides display screens or pages to be displayed on display device 112 such as at least an FMS takeoff and landing display (TOLD) page (or performance takeoff page) of an FMS display (FIG. 3), a noise abatement mode (NAM) page (FIGS. 4-9), and NADP setup summary page (FIGS. 13-15) described below and to receive input of NADP data to set an NADP flight plan for departure and that can be provided to the autopilot/auto throttle unit 120. By one form, the FMS 118, the programs 106, or both have or share an NADP unit 107 that specifically manages the display of the NADP related data and pages, retrieval of the input NADP parameters, and generation of NADP vertical profiles. A thrust control page (FIG. 12) also is provided and may be provided by an Engine Indicating and Crew Alerting System (EICAS) (not shown) that is part of the avionic systems of the aircraft 101 such as computer programs 106, or may be considered to be part of the FMS 118, but in either case, coordinates with the NADP unit 107. Thus, the FMS 118 can populate each page with NADP1 or 2 parameters or can receive customized NADP parameters input by a pilot on the pages, including altitudes, speeds, and/or thrust levels as described below, and that the FMS 118 can provide to the autopilot/auto throttle unit 120.

In various implementations, the navigation database supports the FMS 118 in establishing and maintaining an association between a respective airport, its geographic location, runways (and their respective orientations and/or directions), instrument procedures (e.g., takeoff and approach procedures, arrival routes and procedures, and the like), airspace restrictions, and/or other information or attributes associated with the respective airport (e.g., widths and/or weight limits of taxi paths, the type of surface of the runways or taxi path, and the like). In various implementations, the FMS 118 also supports controller pilot data link communications (CPDLC), such as through an aircraft communication addressing and reporting system (ACARS) router; this feature may be referred to as a communications management unit (CMU) or communications management function (CMF). Accordingly, in various implementations, the FMS 118 may be a source for the real-time aircraft state data of the aircraft.

Whether a customized NADP flight plan is entered into the FMS 118 by a pilot through a user interface 114 or 116 and/or from an automated application, the FMS 118 calculates the distances and courses between all waypoints in the entered route. Later during flight, the FMS 118 provides precise guidance between each pair of waypoints in the route, along with real-time information about aircraft course, groundspeed, distance, estimated time between waypoints, fuel consumed, and fuel/flight time remaining (when equipped with fuel sensor(s)) and other information. The FMS 118 provides FMS data describing the real-time information. By accessing the TOLD, the FMS 118 can provide detailed information about the NADP to be followed by the aircraft and the progression of the aircraft along the NADP.

In implementations, the display device 112 may be any type of screen, whether LED, plasma, and so forth, and may be mounted in the cockpit or may be a mobile or portable device such as a tablet, smart device, or part of an electronic flight bag (EFB). In different alternatives, the display device 112 is one or more devices and includes a head down display (HDD), a head up display (HUD), a wearable HUD, or any combination thereof. By one form, the display device 112 may have an interface 114 that is or has a touchscreen sensor that can send signals to a touchscreen controller (TSC) either on the display device 112 or remote therefrom such as at a display controller 104 at the processing system 102. The sensor often is resistive, capacitive, infrared, or optical based. When a user touches the screen, the sensor registers the touch location. This raw touch signal data is then sent to the TSC 124, by one form that is a microcontroller, and that processes the raw touch signals. The TSC 124 interprets these signals to determine the precise coordinates of a touch event on the screen and translates the signals into digital data. The display controller 104 then analyzes the data to indicate the user's selection or input. The input is then provided to the computer programs 106, the FMS 118, and/or other avionics systems or units of the aircraft that provides the NADP flight plan to be executed by the autopilot/auto-throttle unit 120.

The display device 112 may show a vertical situation display (VSD), a primary flight display (PFD), or both, in addition to the FMS NADP activation page, NAM entry pages, and NSS page mentioned above and described herein showing NADP data. The display device 112 receives display data from the display controller 104 processing system 102 (operating the FMS 118 or other navigation or avionic system) for generating the various NADP displays described herein.

In addition to, or instead of, a touchscreen interface 114, a user interface 116 provides input to one or more system(s) of the aircraft and to the NADP displays and/or pages mentioned above displayed by the display device 112. The user interface 116 includes any device suitable to accept input from a user for interaction with the systems of the aircraft including the NADP displays and pages. For example, the user interface 116 may include one or more of a keyboard, joystick, multi-way rocker switches, mouse, trackball, touch pad, data entry keys, a microphone suitable for voice recognition, haptic devices, and/or any other suitable device. The user interface 116, as with interface 114, allows a user (e.g. a pilot) to enter various NADP parameters including initial altitude, acceleration altitude, climb altitude, end altitude, NADP speed, NADP thrust, and so forth. In addition to the NADP parameters entered through the user interface 114 or 116, the NADP parameters may be at least partly automatically determined by the FMS 118 based on the NADP defined in the flight plan.

Figure 2:
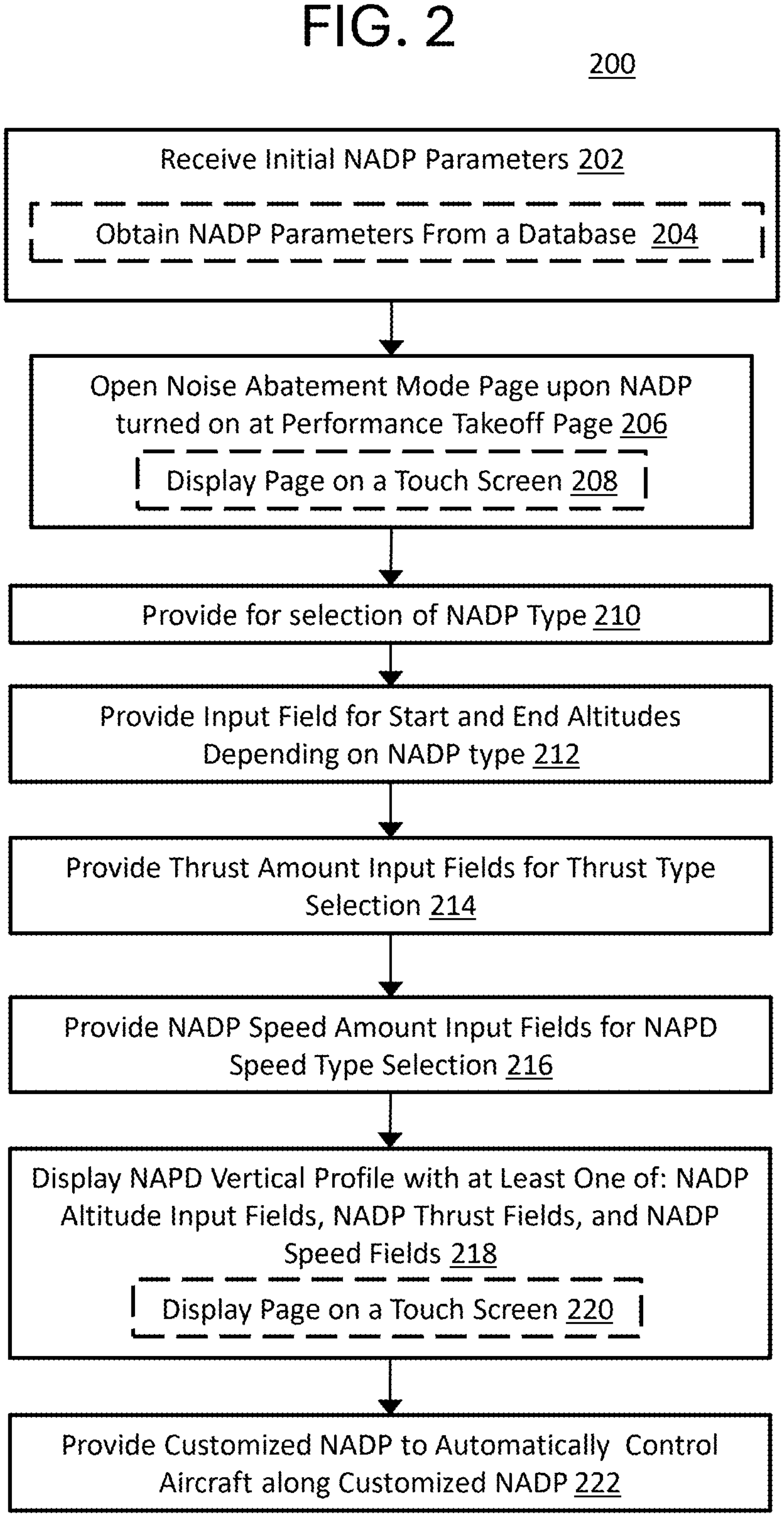
FIG. 2 is a flow chart of a method of generating displays to receive customized parameter input of NADPs according to at least one of the implementations disclosed herein.

In implementations, the processing system 102 implements functions of the aircraft system 100 and operates process 200 of FIG. 2 according to example implementations of the present disclosure. The processing system 102 includes processor circuitry that forms one or more processor(s) 108. The one or more processor(s) 108 can include any suitable processing device, such as shared or specific function central processing units (CPUs), microprocessors, microcontrollers, integrated circuits, logic devices, System on a Chip (SoC), processor cores, or any other suitable processing devices. The processor 108 is communicatively coupled to the memory 110 as well as any of the other units or systems of aircraft system 100 by bus or other known data or signal transfer structures, including wireless structures such as computer or cloud networks, and so forth.

The processing system 102 includes the computer programs 106 which may include any avionics system or unit used by an aircraft and the display controller 104 described above in addition to the NADP unit 107. Specifically, the computer programs 106 include computer-readable instructions that can be executed by the one or more processor(s) 108. The instructions can be any set of instructions that, when executed by the one or more processor(s) 108, cause the one or more processor(s) 108 to perform operations. The instructions can be software written in any suitable programming language and can be implemented in any combination of hardware or firmware. In some implementations, the instructions can be executed by the one or more processor(s) 108 to cause the one or more processor(s) 108 to perform operations of the NADP unit 107, such as the operations for generating displays including NADP input fields that can be populated with NADP parameter data as shown in FIGS. 3 to 12 and on graphical displays such as a vertical profile display (NSS page) for example. Otherwise, the processor 108 implements the aircraft system 100 and performs the computer implemented process 200. Although the display controller 104 is shown separately from the computer programs 106, the processor 108 otherwise can implement display generation by executing the computer program (or computer programs) 106.

The memory 110 can include one or more computer-readable media, including, but not limited to, non-transitory computer-readable media, RAM, ROM, hard drives, flash drives, cache, or other memory devices. It should be appreciated that the functions of the FMS 118 and the autopilot and auto-throttle unit 120 described above can be included in the processing system 102. The memory 110 can store information accessible by the one or more processor(s) 108, including one or more of the computer program(s) 106.

By one alternative form, an NADP database 122 may be part of memory 110 or considered as a separate memory or storage. The NADP database 122 may hold the data for particular combinations of NADP classifications, such as geographic location, airport, airline, aircraft, and so forth, where each combination may have different NADP parameter data. The data may include altitudes, speeds, and thrust levels for example. Such a database may be provided by an avionic standards organization, airline, specific aircraft, pilot, or other compiling entity. The NADP database 122 may be arranged to be in communicative connection with processor 108 for use by the FMS 118 or other NADP related systems. By one form then, depending on the classifications determined by an FMS or input by an aircrew, the FMS may automatically populate the NADP displays described herein using the NADP database.

In operation, and before a flight while the aircraft is on the ground and preparing for a departure, the processing system 102 receives FMS data describing flight modes, autopilot and auto-throttle settings, a proposed flight plan including an NADP portion from the aircrafts current location on the ground. FMS pages may be displayed, and the aircrew may activate an NADP mode to turn the NADP pages on for display and NADP data entry by the aircrew. An NADP summary page NSS shows an NADP vertical profile by one example, and the aircrew may enter desired NADP parameter values on input fields or windows on the vertical profile page in order to customize the NADP as desired. The FMS then provides the customized NADP to the autopilot and auto-throttle for automatic flight following the customized NADP.

Referring to FIG. 2, an example process 200 of display and customizing an NADP has operations 202 to 222, numbered evenly, in accordance with at least one of the implementations described herein. The systems and example displays of FIGS. 1 and 3-15 are referred to while explaining the process 200, and where relevant.

Process 200 may include "receive initial NADP parameters" 202, and this may be a preliminary operation. By one form, this refers to NADP1 and/or NADP2 data already being accessible to the FMS, such as from a navigation or other database, and may be retrieved by the FMS (or NADP unit 107) as needed. Alternatively, for example, this also may include automatically computing NADP data from a flight plan entered so far by the aircrew via an interface, or obtained by the FMS from an external source or a combination of any of these.

By one alternative approach, operation 202 may include "obtain NADP parameters from a database" 204. In this case, a NADP database 122 (FIG. 1) may be generated by compiling custom NADPs. An NADP may include NADP parameter data such as initial or start altitude, acceleration altitude, climb altitude, end altitude, NADP speed, NADP thrust, NADP N1 thrust, and so forth. The database may be accessed by the FMS in one example and to retrieve a custom NADP depending on the classifications of the NADP (location, airport, airline, aircraft, and so forth) that match the current state and location of the aircraft. The FMS may then populate the NADP pages and displays upon the user (pilot) turning on the NADP pages and displays.

Figure 3:
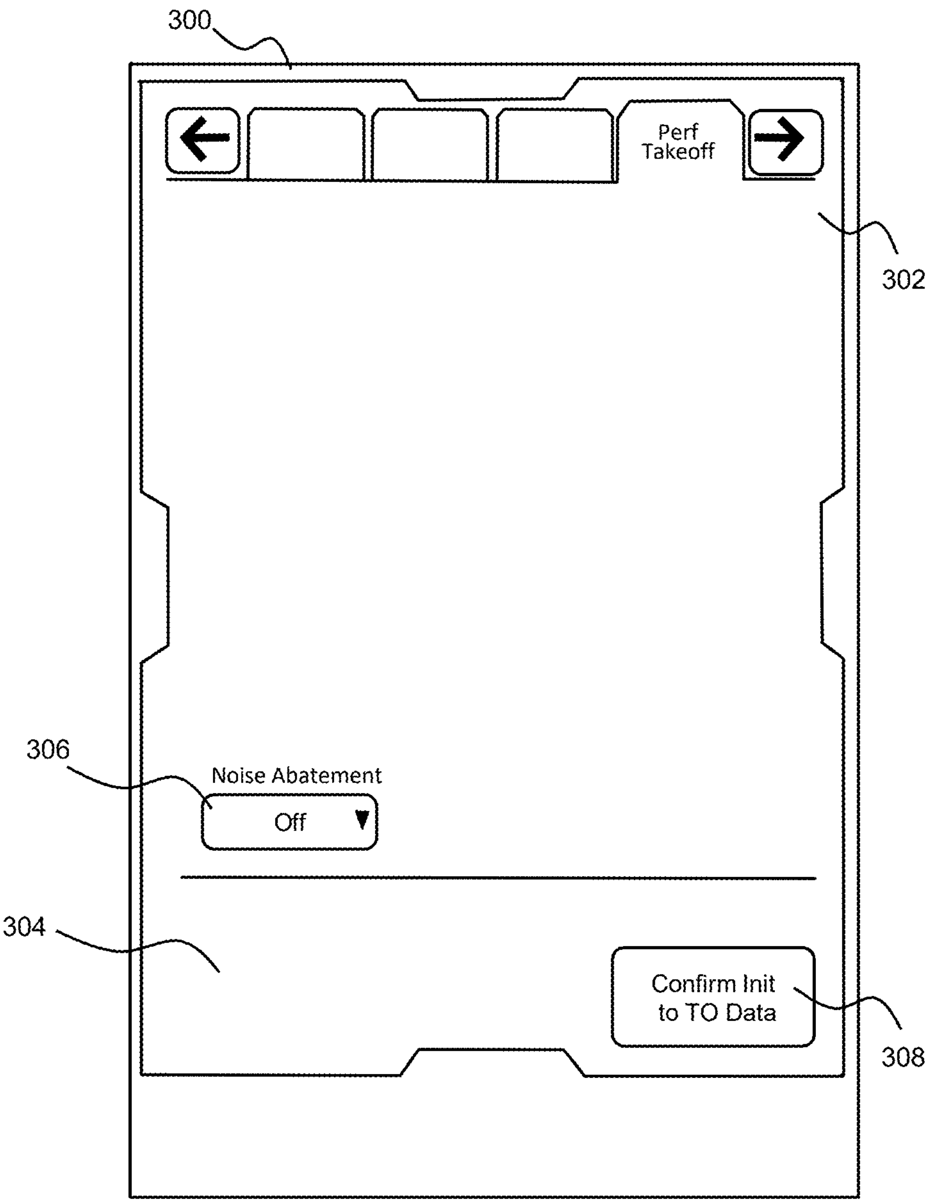
FIG. 3 is a schematic diagram of a flight management system performance takeoff and NADP activation page according to at least one of the implementations disclosed herein.

While referring to FIG. 3, process 200 may include "open Noise Abatement Mode Page upon NADP turned on at Performance Takeoff Page" 206. Thus, the process 200 may be instigated when the pilot is entering the NADP flight plan into the FMS prior to take-off while the plane is on the ground, and in one form, before takeoff roll or during FMS programming or flight planning.

While an activator to turn on NADP modes can be placed on any navigation or other page convenient for the pilot, it has been found that placement of the NADP activator on the FMS takeoff and landing display (TOLD) page is very efficient for the pilot. Thus, as shown, an example FMS display 300 is a Control Display Unit (CDU) or Multifunction Control and Display Unit (MCDU) and that has or may be a touch screen controller as well. The example FMS display 300 provides an number of pages related to the FMS, flight plans, and a performance takeoff page for displaying data related to takeoff. Other pages not shown may be a navigation (NAV) page for displaying navigation data and settings, and a progress (PROG) page for monitoring flight progress and performance. Relevant here, the performance takeoff page 302 may be displayed on a touch screen 304 and has a noise abatement activator 306, here being a virtual button on the touch screen 304 but other forms of activator (or user interface (UI) control) may be used instead. The performance takeoff page 302 also may be referred to as a TOLD.

When the NADP is unselected or deselected, the word "off" appears on the button 306 as shown, or near the button or other location on the display 300. When the NADP is selected at the activator 306, the word "NADP On" or just "On" is shown on the button 306 or other location on the display 300. It will be appreciated that many different words or symbols could be used instead, including no words while the activator lights up, turns a different color, and/or has a different indicator showing the NADP data entry mode is activated. The NADP activator 306 is placed on the FMS TOLD page 302 for a more efficient workflow since TOLD initialization depends on NADP Thrust and NADP Speed, and the FMS runs predictions based on the NADP setting.

By one form, a "Confirm Init to TO Data" activator 308 also is provided to confirm and enter (or submit) the takeoff data to the FMS for computations and in turn, to provide the resulting takeoff flight plan to the autopilot for example. When the NADP activator 306 is present, the "Confirm Init to TO Data" activator 308 may change, such as glow (or bloom with stronger brightness), highlight, different color light, or provide a different indicator and that changes whenever changes to NADP parameter data on the FMS pages or displays has occurred. By one form, no changes to the NADP parameter data will be applied unless the "Confirm Init to TO Data" activator 308 is activated such as when a button forming the activator 308 is pressed.

Referring to FIG. 4, when the NADP activator 306 is turned on, the FMS or NADP unit 107 opens a noise abatement mode (NAM) page 400 in response. Operation 206 may include "display page on a touch screen" 208, such that here too, the NAM page 400 may be displayed on a touch screen 402 so that NADP-related mode selections and NADP parameter inputs can be made directly on the NAM page 400 screen. Alternatively, other options for entering data in addition to a touch screen are available as mentioned above with interfaces 114 and 116.

The NAM page 400 shows an NADP mode activation button 404 that is off when no NADP mode has been selected yet, and can be depressed to turn off the NADP modes. The NADP mode activation button 404 may have a highlighted, glowing or colored surface, outer boundary, small light, and/or another UI control type on the button 404 that indicates none of the NADP mode types are selected.

Process 200 may include "provide for selection of NADP type" 210. Here, the NAM page 400 has buttons (or other UI control activator) for selecting which NADP type (or profile or just NADP) is to be used, here being one button 406, 408, 410 each respectively for NADP1 (the "close-in" NADP), NADP2 (the "distant" NADP), and Custom mode (or profiles), where each button has an outline, label, and indicator light that changes in lighting up, brightness, color, and so forth to show which type was selected by a user. It will be understood that other types of UI control activators and/or indicators can be used instead.

Once an NADP type is selected, additional entry fields are provided and related to the TOLD for example, and that are different depending on the NADP mode selected. The Process 200 may include "provide input field for start and end altitudes depending on NADP type" 212. In the present example, the NADP1 mode 406 is selected on NAM page 400 so that NAM page 400 shows an altitude section 440 with an "NS: Thrust reduction" input field or window 412 to enter the start altitude of the NADP when thrust is first reduced from an initial or take-off (TO) thrust. A usual NADP1 start altitude may be 800 ft. above ground level (AGL). The data field 412 either may be initially populated with the 800 value by the FMS, where the pilot can revise the value if desired. Otherwise, the data field 412 is left blank for the pilot to fill in. In either case, the pilot can directly enter the value on the touch screen by using a finger or other pointer or by typing in the altitude amount on another interface such as a keyboard where the number will show up on the altitude field. For the touch screen option, and after a pilot touches the input field 412, a popup virtual keyboard or number pad 416 may be shown and used by the pilot to enter numbers, words, or symbols as needed. Thus, in addition to, or instead of, having the user type or write text into an input text field, the NAM page 400, and page herein may have UI (user interface) library widgets or activators such as buttons, checkboxes, radio buttons, dropdown menus, sliders, modals, progress bars, etc. that provide a list of most likely values that can be selected by the user to then populate the input field rather than entering text character by character. Many variations for entering data directly into fields or windows on a screen may be used here, and a description of any of the input fields described herein receiving an NADP parameter value from a user or pilot refers to any suitable method used, whether by touch screen or another method.

The NADP1 selection 406 also provides an input field 414 to enter an "NE: End altitude", here shown as 3000 ft AGL. After this NE point during flight, the NADP1 is exited and thrust may be increased to a climb thrust. The NE data field 414 and any of the data entry fields on the NADP pages or displays have the same options for pilot data entry as the start data field 414, including that the FMS (or other system of the aircraft) may or may not initially populate the data field, and the pilot has the option to enter an initial NADP parameter value or change the NADP parameter value already in the data field.

The title and expected NADP altitude to be entered into the altitude input fields 412 and 414 can be different depending on the mode, and can be different depending on other features or characteristics of the start and stop altitudes of the NADP. For example, and for comparison to the NAM page 400 for NADP1, a NAM page 400 (FIG. 7) with NAPD2 408 selected shows selection buttons and input fields relevant to NADP2, while NAM page 400 (FIG. 9) with Custom 410 selected shows selection buttons and input fields relevant to a custom NADP. Specifically with regard to altitude, when NADP2 is selected, a start altitude field 712 is labeled "NS: NADP SPD trans" or speed transition. In this case, the thrust in NADP2 does not change upon reaching the start NADP altitude, but the speed changes from a V2 take-off speed for example, and to an NADP speed such as $VS_E$ described below. Likewise for the custom mode 410, the NAM page 400 (FIG. 9) shows the same NS thrust reduction start altitude label for an input field 1012 as input field 412 of the NAM page 400, but the NADP end input field 1014 is labeled "NE: CLB SPD trans" to indicate that the NADP end altitude may have a change from an NADP speed to a climb speed but not necessarily a change in thrust. Many variations can be provided. By one example form, the labels of the NADP start and end altitude input fields can be changed depending on an NADP automatically or manually selected from a database, for example.

Returning to NAM page 400, another NADP parameter that can be customized on the NAM page 400 is thrust. Thus, process 200 may include "provide thrust amount input fields for thrust type selection" 214. A thrust section 450 is shown divided from the altitude section 440 on the NAM page 400, and a thrust section is provided no matter the NADP mode selection 406, 408, or 410. The thrust section 450 may be labeled differently depending on the thrust to be entered for a particular NADP mode selection 406, 408, or 410. For NADP1 in section 450 for example, the thrust is labeled "NADP N1" and the N1-based thrust is to be entered as a percentage of N1. For NADP2 in a thrust section 750 (FIG. 7) for example has the thrust section label "NADP thrust at flaps up", which refers to when or after flaps are retracted and after the NADP2 start altitude is passed. Also for the Custom thrust section 950 (FIG. 9), the thrust section label is simply "NADP thrust" since it can be any type of thrust desired by the pilot.

The thrust section 450 (FIG. 4) provides a button 418 to select among three thrust entry modes including computed, CLB (climb), or Manual, where one of three lights (or circles or any other similar UI control indicator) on the button 418 may glow or be filled-in to indicate the selection. Computed selection section 450 refers to when the FMS or other system has computed the thrust and the pilot wants to see the computed value on a thrust data or input field 420. This may be the default display when the page 400 is turned on.

An alternative CLB thrust section 500 (FIG. 5) is displayed on the NAM page 400 instead of the computed section 450 when CLB is selected at button 502 (which is functionally the same as button 418) and refers to a climb thrust limit or climb rating related to preprogrammed limits of the engines of the aircraft. This may be a specific rating provided by the aircraft manufacturer or other entity. Alternatively, the CLB thrust may be computed by the aircraft systems, such as the auto-throttle or other avionic systems. Thus, the thrust may be a value shown at a thrust data input field 504 determined automatically and can be displayed by selecting CLB, or may be a value the pilot obtains from an aircraft manual or other source for example. Thus, in this example and others, the pilot can enter a thrust value, such as a percentage of N1 directly into the NAM page 400 of the FMS when the NADP pages are considered to be part of the FMS, but could be other aircraft systems.

Referring to FIG. 6, when manual thrust is selected, a manual thrust section 600 is shown instead of computed section 450. In this case, the manual selection is shown on the button 602, and the pilot is permitted to input a desired thrust value, such as 77% N1 shown in thrust data field 604. The pilot may have many reasons to enter a manual value, such as when it is desired to exit the NADP faster, or the specific airport where the aircraft is taking off from has a different NADP thrust requirement than the NADP1 and 2 standards. Many reasons exist to change the thrust from the standards.

The same three thrust data entry options (Computed, CLB, and Custom) are provided no matter the NADP mode selection (NADP1, NADP2 (FIG. 7), Custom (FIG. 9)). It will be understood that other thrust options can be provided not mentioned here, or the thrust options can be different depending on the NADP mode selection.

The manual entry of the NADP thrust provides the pilot with excellent flexibility and reduction of workload. Since such entries can then be provided to the autopilot/auto-throttle unit by the FMS, the pilot no longer needs to remember the thrust value and perform the thrust manually.

Referring again to FIG. 7, and with regard to speed, process 200 may include "provide NADP speed amount input fields for NADP speed type selection" 216. The NAM page 400 for NADP1 does not have NADP speed entry options since speed is constant for NADP1 during the NADP, such as at take-off safety speed V2 or V2+10, but such a speed section could be provided when desired. On the other hand, the NAM page 400 for the NADP2 selection 408 has a speed data entry section 752 with an "NADP speed" label, a speed type selection button 726 with a light or circle indicating each selection, and a speed input or data entry field or window 728.

The speed section 752 has available options between $V_{SE}$ speed or manual shown on an alternative speed section 800 (FIG. 8) with the selection button 802 and the speed data entry field 804. NADP2 assumes acceleration $V_{SE}$ speed upon flap retraction at the NADP start altitude, but other speeds could be used instead. Thus, it will be appreciated that other options can be used instead or more options can be provided than just $V_{SE}$ and manual.

The speed Vse stands for (safety) single engine, which is a speed limit set by aircraft manufacturers for certain planes. While a $V_{SE}$ speed can refer to a target speed during departure when an engine out occurs during departure, it also can refer to a departure volume speed (when an airport has high volume of traffic) that is set for departing aircraft at an airport or other location in order to maintain safe distances from nearby air traffic. This may be a default value of a specific NADP for a particular aerodrome or airport, or may be an instruction, such as that from an air traffic control (ATC), before an aircraft departs. In this case then, the $V_{SE}$ may be populated automatically in the data field 728 on the NAM page 400 (FIG. 7) if already received by the FMS for example, or may be entered manually into the entry data field 728 by the pilot instead.

Otherwise, when manual is selected at the button 802 and the section 800 is placed on page 400 instead of section 750, the pilot may manually enter a desired speed (here being 160 kts as a random example) onto the manual speed data field 804.

Referring to FIG. 9, the NAM page 400 for the Custom selection 410 shows a speed section 1052 with title "NADP speed at gear up" to change the speed when the landing gear is retracted rather than at a certain NADP start altitude. The section 1052 also has a button 1026 to select between $V_{SE}$ and manual options, and a speed data entry field 1028. This Custom selection 410, however, results in providing two different $V_{SE}$ speed options including the NADP speed at gear up shown on NAM page 400 here, and an alternative section 1000 (FIG. 10) just labeled NADP speed over the selection button 1002 and speed data entry field 1004 without considering the landing gear for example.

When manual is selected instead of one of the $V_{SE}$ options, a manual section 1100 is shown instead of section 1052 on the NAM page 400, and that is labeled NADP speed above the selection button 1102 and speed data entry field 1104. The manual speed section 1100 is the same as the manual speed section 800 (FIG. 8) shown for the NADP2 selection 408 (FIG. 7), and can be any specific desired relevant speed rather than the $V_{SE}$ speeds.

Thus, the thrust and speed sections on the NAM page 400 may have generic labels or more specific labels when a particular class or type of speed or thrust is to be used repeatedly, thereby adding more efficiency and ease of understanding for the pilot.

The NADP data also may be displayed on other pages of the FMS display 300 for consistency, ease of understanding, and reduction of workload. By one approach, the NADP speed may be displayed on the flight plan tab of the FMS display 300, and the thrust type and one or more of the NADP start or end altitudes may be shown on the performance takeoff page 302 when the CLB (climb) data button is activated that also shows obstacle clearance data. Many variations are contemplated.

Figure 12:
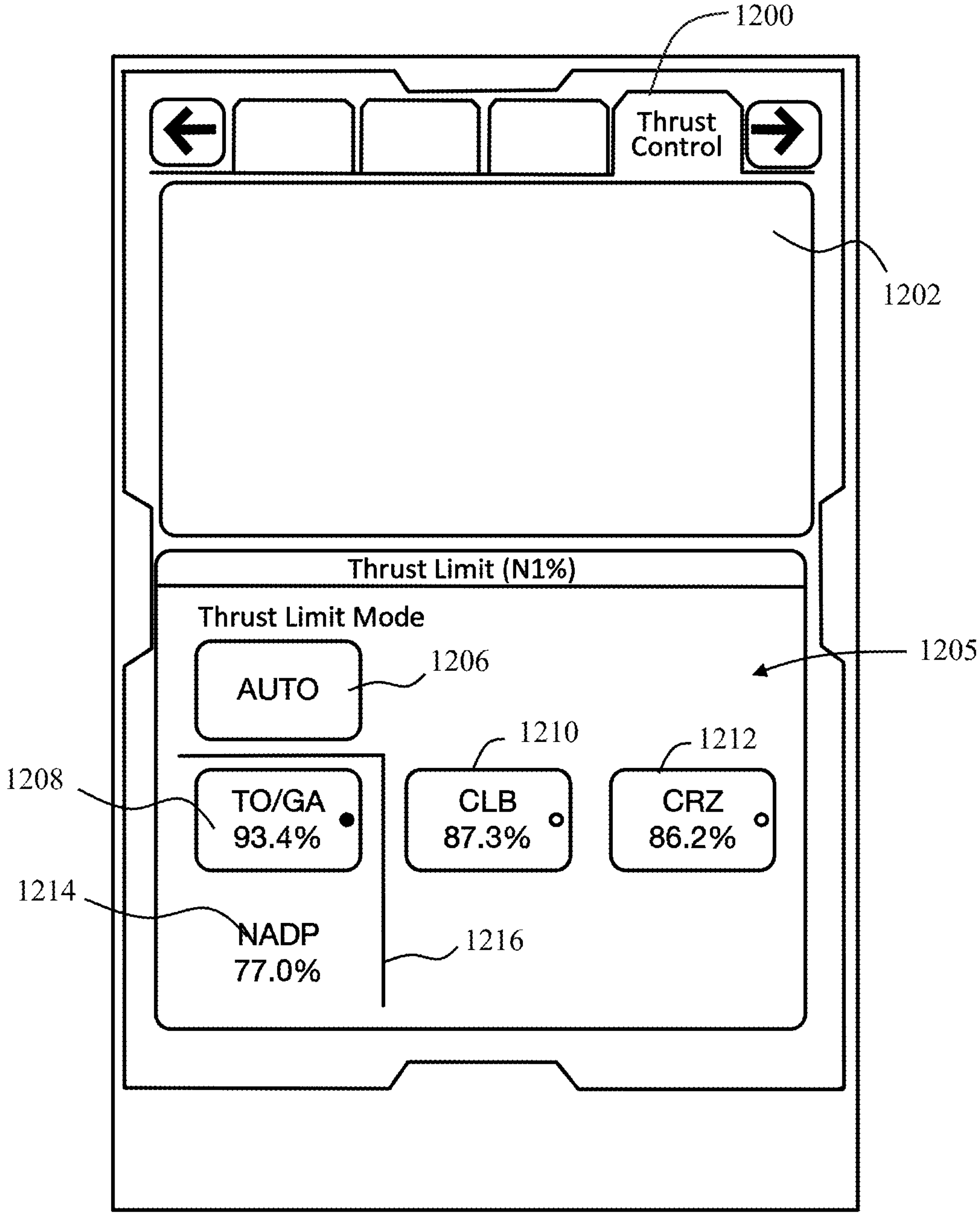
FIG. 12 is a schematic diagram of a thrust control page according to at least one of the implementations disclosed herein.

Referring now to FIG. 12, another page related to thrust entries may be a thrust control page 1200 that is provided as part of an Engine Indicating and Crew Alerting System (EICAS), Electronic Centralized Aircraft Monitor (ECAM), or other avionic system or suite entirely or partially on the aircraft. The thrust control page 1200 has a number of displays and selections that are related to the NADP but others that are not related to NADP and need not be described here. As with the NAM page 400, the display device showing the thrust control page 1200 may be a touch screen 1202 so that a user can select certain modes and/or input of values directly onto the thrust control page 1200 as described with the other pages 400.

Relevant here, the thrust control page 1200 shows N1 thrust limits in percentages of N1 which displays a thrust limit (N1%) section 1205 of the thrust control page 1200. It will be understood that different thrust limits and thrust-related data can be displayed other than the N1 thrust limits shown when the other buttons are selected and need not be described here.

The thrust limit section 1205 has an auto button 1206, a takeoff/go around (TO/GA) button 1208, a climb (CLB) button 1210, a cruise (CRZ) button 1212, and an NADP thrust level (or rating) display 1214 to display different thrust levels for different phases of a flight. These thrust levels are upper thrust limits that restrict the thrust levels to increase efficiency and/or performance as well as to stay within safety limits for the aircraft. The thrust limits may be set by using the FMS and other systems on the aircraft as well as obtaining the thrust levels or related data form aircraft manufacturers or other sources.

Shown here, when the auto button 1206 is selected, the avionic system will automatically change the thrust limit to an appropriate setting without requiring manual intervention from the air crew. This involves changing the thrust limit from phase to phase of the flight. The TO/GA button 1208 indicates the takeoff thrust limit on the button in this example, the CLB button 1210 indicates the climb thrust limit, while the CRZ button indicates the cruise thrust limit. Each button 1208, 1210, and 1212 can be depressed manually instead of using the auto button 1206, and each has an indicator light or circle to show which thrust limit is being used as a current limit for a current flight phase.

The thrust limit section 1205 also has an NADP thrust area 1214 that shows the NADP thrust limit, here being 77% of N1. The thrust limit may be computed automatically or entered by a user either on the thrust page 1200 or on the other NAM page 400 or NSS page 1300, 1400, or 1500 described below. A line 1216 is provided on the thrust limit section 1205 to divide the TO/GA button 1208 and the NADP thrust display 1214 from the other buttons 1210 and 1212 to better associate the NADP thrust with the takeoff thrust.

As another feature of the thrust control page 1200 to be used during flight, the thrust limit section 1205 may have different buttons lit (or otherwise have a changed UI appearance) depending on the status of the NADP during flight. For example, within the thrust limit section 1205, when only the auto button 1206 and TO/GA button 1208 are lit (or have the same color), then the NADP thrust mode is armed. This is indicated when an NADP has been defined and armed (e.g. through pilot manual selection for example) but the aircraft has not yet reached the start NADP altitude during flight. The NADP thrust level also may have a certain color (such as blue as one example) indicating the NADP is armed but not yet active, while the auto and TO/GA buttons are green for this example. Similarly, when only the auto button 1206 and the NADP thrust value 1214 are lit, then the NADP thrust mode is active. NADP active is indicated when the thrust has been reduced to the NADP thrust and the aircraft is currently flying in an NADP region (i.e. between the start altitude and the end altitude). In this case, the NADP thrust level value itself of NADP display 1214 also may be green or the same color as the auto button 1206 to indicate it is active. When only the auto button 1206 and the CLB button 1210 are lit, then the NADP thrust mode is off.

These views cumulatively create greater situation awareness during NADP operations. Such information would help a flight crew to anticipate normal changes in engine operation and reduce the stress of managing the aircraft during crucial flight periods. Further, such views can add consistency in display of NADP information across various information sources in a cockpit of an aircraft.

Returning again to FIG. 4, and in addition to configurable parameters, the NAM page 400 includes a "Summary" button 424 and an "Apply" button 422. The "Apply" button 422 applies the altitude, speed, and/or thrust values (or any other value) so that the FMS uses them to create a flight plan to provide to the autopilot/auto-throttle unit and for display to the aircrew, and this includes any NADP customized values that were entered directly onto the NADP pages described herein.

The summary button 424 opens a summary page with a vertical profile of the NADP as entered by the pilot, or at least from data presently displayed on the NAM page 400. The following is a description of the summary page.

Figure 13:
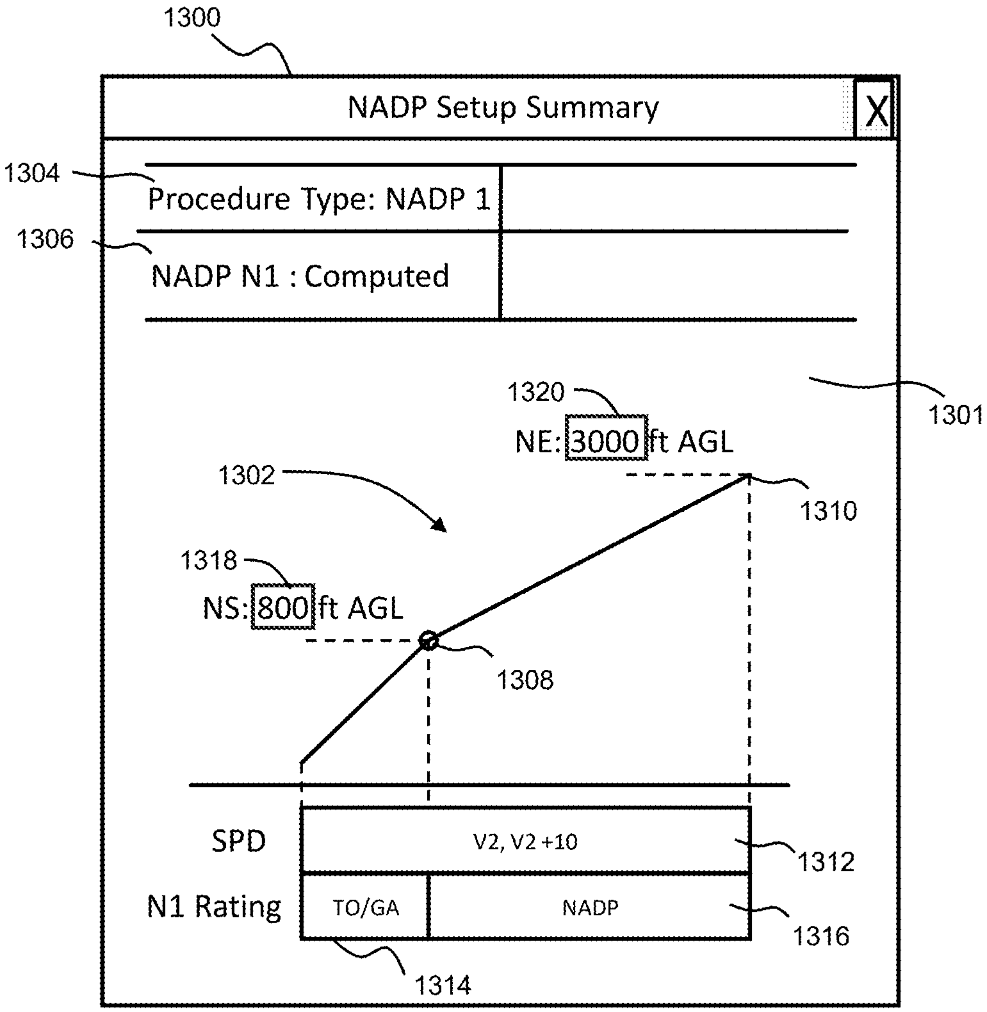
FIG. 13 is a schematic diagram of a vertical profile NADP setup summary page according to at least one of the implementations disclosed herein.
Figure 14:
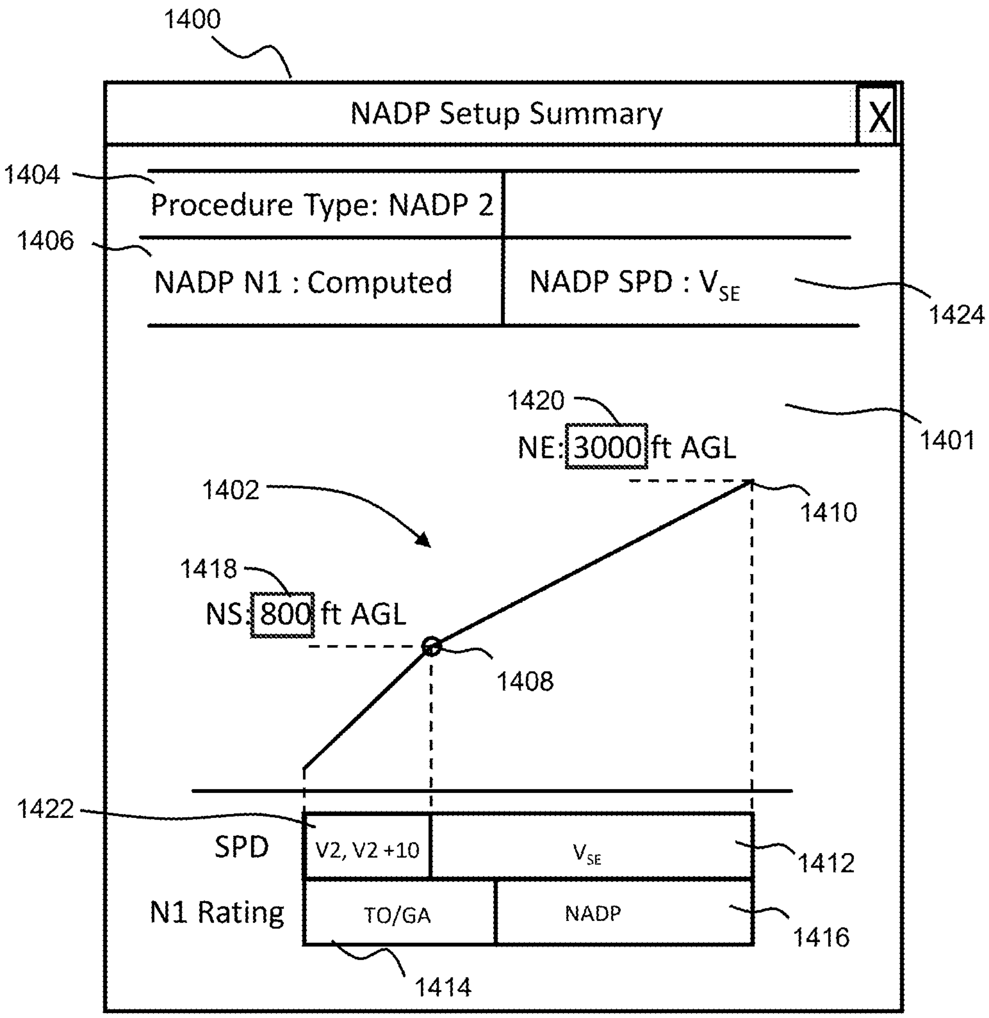
FIG. 14 is a schematic diagram of another vertical profile NADP setup summary page according to at least one of the implementations disclosed herein.
Figure 15:
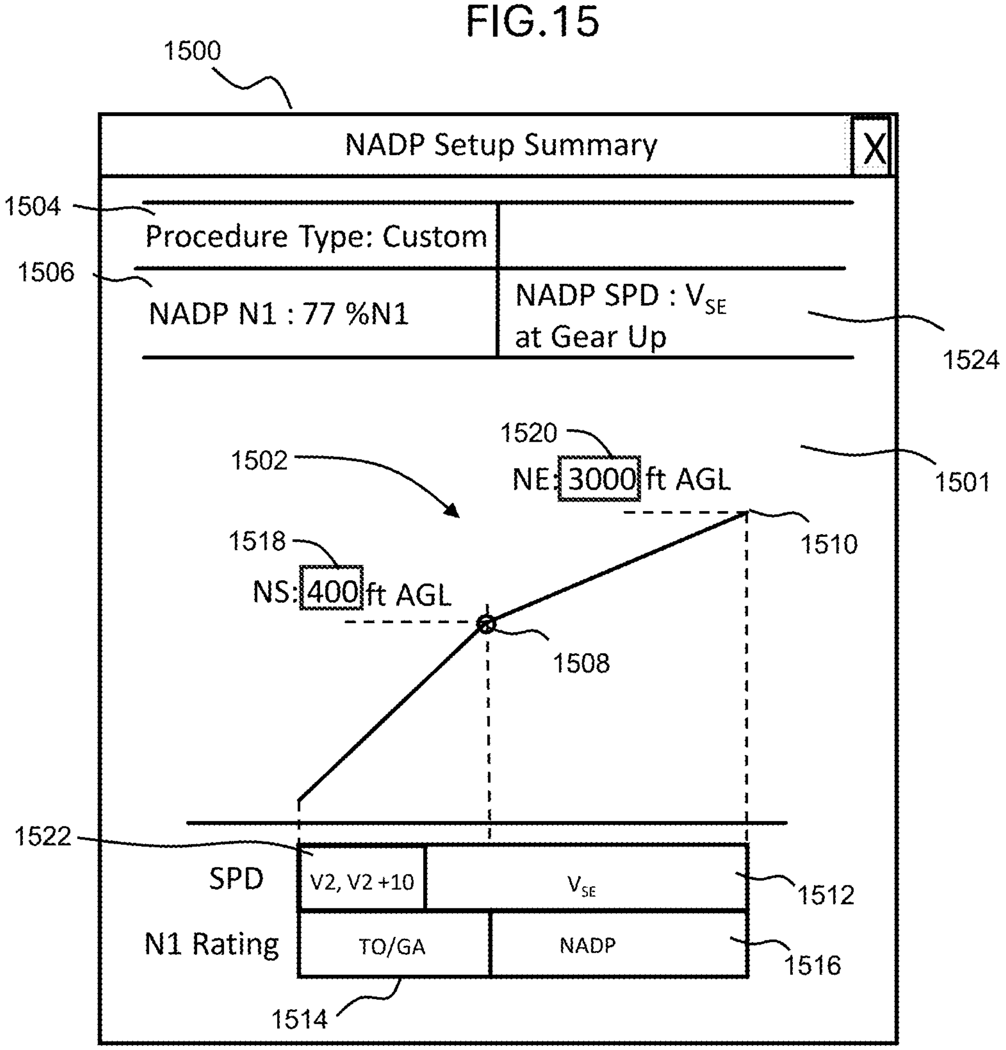
FIG. 15 is a schematic diagram of yet another vertical profile NADP setup summary page according to at least one of the implementations disclosed herein.

Referring to FIGS. 13-15, process 200 may include "display NADP vertical profile with at least one of: NADP altitude input fields, NADP thrust fields, and NADP speed fields". As with NAM page 400, process 200 here also may include "display page on a touch screen" 220, and as already described above for direct entry of NADP inputs from a pilot.

Referring to FIG. 13, when a user presses the "Summary" button 424 on the NAM page 400, this opens an NADP vertical profile summary page, here titled as "NADP Setup Summary" (NSS) page 1300 but also referred to as an NADP profile summary page. The NSS page 1300 may be displayed on a display device on an aircraft, and may or may not be part of the FMS display 300. The NSS page 1300 provides a visual or graphical profile of the NADP with a summary of speed and thrust management along the profile, and has a touch screen 1301 as described above with the other touch screens.

The NSS page 1300 has a procedure type field 1304, here selected as NADP1, to indicate that the vertical profile is a NADP1 profile, and an NADP thrust field "NADP N1:" 1306 to indicate the thrust was computed as described above for the NAM 400 and thrust section 450. The NSS page 1300 also has a vertical departure profile 1302, here being an NADP1 profile as mentioned, with an NADP initial or start altitude 1308, here being 800 ft AGL, and an NADP end altitude 1310, here being at 3000 ft AGL. These values may be obtained from the NAM page 400 (FIG. 4), for example. The windows 1318 and 1320 around the altitude values are data input windows or fields so that the user can change the values directly on the NSS page 1300. The procedure type and NADP N1 selections 1304 and 1306 may be populated from the NAM page 400, and also may be changed or entered on the screen 1301 by a user here. Otherwise, the NSS page 1300 may be static including a static speed indicator or field 1312, which is constant after lift-off (or rotation) until the end 1310 of the NADP profile 1302. The example here shows a speed of V2 (safe takeoff speed) or V2+10 knots as initial speed from lift-off to the start altitude 1308. An N1 rating for thrust field 1314 shows the takeoff thrust is the TO/GA thrust before an NADP thrust field 1316 that starts at the NADP initial altitude 1308 and with a reduced NADP thrust that is less than the TO/GA thrust and continues until the NADP end 1310. It will be understood that the speed and thrust fields 1312, 1314, 1316 may be input fields as well when desired.

By one form, when the user changes the NADP parameters on the NSS page 1300, the NAM page 400, or other NADP-related pages, the NSS page 1300 automatically refreshes to incorporate the new NADP parameters so that the pilot can receive a visual representation of the changed NADP relatively quickly.

Referring to FIG. 14, an NSS page 1400 has a vertical profile 1402 for an NADP2 as indicated at the procedure type field 1404. A NADP N1 thrust field 1406 shows the computed option was selected as the thrust type or source. For this NADP2 example, the speed is to be changed at an NADP start or initial altitude 1408 (also referred to as an acceleration altitude) as shown by speed data input field 1424, and speed fields 1422 and 1412. In this example, the initial speed field 1422 is fixed and here shows speed of V2 or V2+10, while the subsequent NADP speed field 1412 is set at $V_{SE}$, although it could be another speed. In this example, the speed fields 1424 and 1412 are data input fields that can be changed on a touch screen 1401 (or other type of screen and other type of interface entry) showing the image of the NSS page 1400.

The thrust remains the same as set in an initial thrust field 1414, and until after the speed change at NADP start altitude 1408 as shown by NADP thrust field 1416 that continues until an NADP end altitude 1410. Both of the altitudes are entered in a data input field 1418 or 1420 so that the altitudes can be changed as mentioned with NSS page 1300. In the present example, both thrust fields 1414 and 1416 are fixed fields, and only the NADP speed in window or field 1412 can be changed on the speed/thrust duration part of the graph 1402. The change from the TO/GA thrust to the NADP thrust indicates the point of NADP thrust at flaps up (and retraction of the flaps) after passing the start altitude 1408.

Referring to FIG. 15, an NSS page 1500 is similar to NSS pages 1300 and 1400. Here in this example, a procedure type input field 1504 is indicated as custom. This may be filled in here or populated from NAM page 400. An NADP N1 thrust input field 1506 shows thrust at 77% N1, and again as entered here on NSS page 1500 or obtained automatically from NAM page 400. An "NADP SPD at gear up" input field 1524 is also provided and here receives a speed of $V_{SE}$ that is changeable as with field 1424.

Also in this example, a custom NADP vertical profile has a NADP start or initial altitude 1508 of 400 ft AGL and an NADP end altitude 1510 of 3000 ft AGL where the two altitudes are in input fields 1518 and 1520 that permit modification of the altitudes in the input fields 1518 and 1520 as with NSS pages 1300 and 1400. The speed (SPD) fields include an initial speed field 1522 that is fixed and is to be performed before a subsequent NADP speed indicated at an NADP speed data input field 1512 that can be modified by the user on the touch screen 1501 with the image of the NSS page 1500. The field 1512 shows a speed of $V_{SE}$. An initial thrust field 1514 continues until the aircraft is scheduled to have its gear up which establishes the start of the reduced NADP thrust indicated in the NADP field 1516 and at the NADP start altitude 1508. Both thrust fields 1514 and 1516 are fixed in this example, but can be modifiable input fields when desired.

Process 200 optionally may include "provide customized NADP to automatically control aircraft along customized NADP" 222. Here, the FMS receives the NADP profile and parameter data entered by the pilot and generates (or completes) a flight plan to be provided to the autopilot and/or auto-throttle unit for automatic flight during the NADP.

It will be appreciated that the operations of process 200 may be performed out of the order presented, or one or more operations may be omitted, and still may be within the scope of the disclosed implementations.

Other displays may be used in conjunction with the displays mentioned above and whether before a flight or during the flight. This may include a VSD that shows the NADP, NADP bugs on an altitude tape (whether on a primary flight display (PFD) or vertical situation display (VSD), bugs and/or marks on an engine display, a head up display (HUD), and/or a head down display (HDD).

As used herein, the term "unit" or "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Implementations of the present disclosure, including system 100 (FIG. 1), may be described herein in terms of functional and/or logical components and various processing operations. It should be appreciated that such components may be realized by any number of hardware, software, and/or firmware components configured to perform the specified functions. For example, an implementation of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that implementations of the present disclosure may be practiced in conjunction with any number of systems, and that the systems described herein is merely example implementations of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an implementation of the present disclosure.

It will be appreciated that the various illustrative logical blocks, units, circuits, and algorithm operations described in connection with the implementations disclosed herein may be implemented as electronic hardware, computer software, or combinations of both. Some of the implementations are described above in terms of functional and/or logical block components (or units) and various processing steps. However, it should be appreciated that such block components (or units) may be realized by any number of hardware, software, and/or firmware components configured to perform the specified functions. To clearly illustrate this interchangeability of hardware and software, various illustrative components, blocks, units, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an implementation of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that implementations described herein are merely example implementations.

The various illustrative logical blocks, units, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the implementations disclosed herein may be embodied directly in hardware, in a software unit executed by a processor, or in a combination of the two. A software unit may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process operations must be performed in a temporal or logical order according to such sequence unless it is specifically defined by the language of the claim. The process operations may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one example implementation has been presented in the foregoing detailed description of the invention, it should be appreciated that a vast number of variations exist. For example, the solution can be further broadened to non-weather information (e.g. airspaces). It should also be appreciated that the example implementation or example implementations are only examples, and are not intended to limit the scope, applicability, or configuration of the invention in any way. Rather, the foregoing detailed description will provide those skilled in the art with a convenient road map for implementing an example implementation of the invention. It being understood that various changes may be made in the function and arrangement of elements described in an example implementation without departing from the scope of the invention as set forth in the appended claims.

What is claimed is:

1. An aircraft system, comprising:

at least one display device within an aircraft;

a flight management system (FMS);

at least one user interface; and processor circuitry forming at least one processor communicatively coupled to the display device, the FMS, and the user interface, the at least one processor arranged to operate by:

displaying, prior to take-off while the aircraft is on the ground, at least one noise abatement departure procedure (NADP) page, wherein the NADP page comprises:

a page title indicating the NADP page includes NADP-related parameters, wherein the title includes at least the term NADP or noise abatement, an NADP selection section simultaneously displaying multiple selectable activators including an NADP1 activator, an NADP2 activator, and a custom NADP activator selectable by a user, wherein the NADP page comprises a combination of elevation section, a thrust section, and a speed section depending on which NADP activator is selected, wherein the NADP page is arranged with labeled input fields stating which parameter is to be placed or displayed in the input fields so that:

when the NADP1 is selected, no speed section is provided and the elevation section displays an NADP start (NS) thrust reduction altitude input field and a NADP end (NE) altitude input field, and the thrust section displays an NADP N1 input field that provides alternatives of computed by the FMS, climb, and manual as a title of the input field in % N1, when the NADP2 is selected, the elevation section displays an NS NADP speed transition altitude input field and the NADP NE altitude input field, and the thrust section displays an NADP thrust at flaps up input field with the N1 input field that provides the same alternatives as for the NADP1 thrust section, and a speed section provides alternatives of manual and safety single engine speed (Vse) with an input field, when the custom NADP is selected, the elevation section displays an NS thrust reduction altitude input field and an NE climb speed transition altitude input field, and the thrust section displays an NADP thrust input field with the N1 input field that provides the same alternatives as for the NADP1 thrust section, and a speed section provides an NADP speed gear up input field with alternatives of manual and safety single engine speed (Vse), and loading NADP parameter values input into at least one of the input fields by a user as part of a customized NADP into the FMS to have the aircraft automatically fly the customized NADP.

2. The aircraft system of claim 1, wherein the at least one processor is arranged to display the NADP page in response to a user making a selection on an NADP activator on the user interface.

3. The aircraft system of claim 1, wherein the NADP page displays an activator that opens is an NADP vertical profile summary page with a vertical profile of the NADP and multiple input fields arranged to receive an NADP parameter value from the user, wherein the NADP parameter values include at least thrust values, aircraft speed values, or both.

4. The aircraft system of claim 3, wherein the NADP vertical profile summary page graphs a vertical profile by showing speed or thrust or both durations along and adjacent the vertical profile versus altitudes of the vertical profile.

5. The aircraft system of claim 3, wherein at least one of the speed or thrust along the vertical profile is one of the input fields that is one of multiple adjacent input fields that can be changed by the user, wherein the adjacent input fields are physically displayed adjacent the vertical profile and within a graph of the vertical profile rather than at vertical or horizontal label or scale axes of the vertical profile.

6. The aircraft system of claim 3, wherein the NADP vertical profile summary page has input fields to receive NADP parameter values from the user of at least one of: initial altitude, end altitude, initial speed, NADP speed, initial thrust, and NADP thrust, wherein the inputs fields are adjacent input fields physically displayed adjacent the vertical profile and within a graph of the vertical profile rather than at vertical or horizontal label or scale axes of the vertical profile.

7. The aircraft system of claim 3, wherein the image of the vertical profile changes to match the NADP parameter values entered into the input fields of the NADP vertical profile summary page.

8. The aircraft system of claim 1, wherein the multiple selectable activators are maintained and the selected one of the multiple selectable activators has a changed appearance relative to the other multiple selectable activators.

9. The aircraft system of claim 8, wherein at least one of the input fields is initially automatically populated with a parameter value by the FMS and is modifiable by a user.

10. The aircraft system of claim 1, wherein the input field of the thrust section is related to an NADP thrust that is reduced from an initial take-off thrust, and wherein the FMS is arranged to set an autopilot or autothrottle to reduce thrust of the aircraft after departure to the NADP thrust automatically.

11. A method, comprising:

displaying on a display device onboard an aircraft, prior to take-off while the aircraft is on the ground, at least one noise abatement departure procedure (NADP) page, wherein the NADP page comprises:

a page title indicating the NADP page includes NADP-related parameters, wherein the title includes at least the term NADP or noise abatement, an NADP selection section simultaneously displaying multiple selectable activators including an NADP1 activator, an NADP2 activator, and a custom NADP activator selectable by a user, wherein the NADP page comprises a combination of elevation section, a thrust section, and a speed section depending on which NADP activator is selected, wherein the NADP page is arranged with labeled input fields stating which parameter is to be placed or displayed in the input fields so that:

when the NADP1 is selected, no speed section is provided and the elevation section displays an NADP start (NS) thrust reduction altitude input field and a NADP end (NE) altitude input field, and the thrust section displays an NADP N1 input field that provides alternatives of computed by the FMS, climb, and manual as a title of the input field in % N1, when the NADP2 is selected, the elevation section displays an NS NADP speed transition altitude input field and the NADP NE altitude input field, and the thrust section displays an NADP thrust at flaps up input field with the N1 input field that provides the same alternatives as for the NADP1 thrust section, and a speed section provides alternatives of manual and safety single engine speed (Vse) with an input field, when the custom NADP is selected, the elevation section displays an NS thrust reduction altitude input field and an NE climb speed transition altitude input field, and the thrust section displays an NADP thrust input field with the N1 input field that provides the same alternatives as for the NADP1 thrust section, and a speed section provides an NADP speed gear up input field with alternatives of manual and safety single engine speed (Vse), and wherein at least one of the input fields on the NADP page is arranged to receive an NADP parameter value from a user after display of the at least one input field;

receiving the NADP parameter value from a user via an interface that provides the NADP parameter value to be entered into the at least one input field; and loading the NADP parameter value as part of a customized NADP into a flight management system (FMS) to have the aircraft fly automatically according to the customized NADP.

12. The method of claim 11, wherein all of the input fields on the NADP page relate to an NADP.

13. The method of claim 11, wherein the climb alternative of the thrust section provides a climb thrust limit or climb rating related to preprogrammed limits of engines of the aircraft automatically populated into the input field of the thrust section, and wherein the thrust section has a different title depending on which NADP type of multiple available alternative NADP types including a custom NADP type that was selected by a user.

14. The method of claim 11, wherein the climb alternative of the thrust section provides a climb thrust value provided by an auto-throttle system onboard the aircraft automatically populated into the input field of the thrust section.

15. The method of claim 11, wherein the speed section has a different title depending on which NADP type of multiple available alternative NADP types including a custom NADP type and that was selected by a user.

16. The method of claim 11, wherein the NADP page has a vertical profile activator that when activated by a user displays a vertical profile page separate from the NADP page and display a vertical profile of the NADP using at least one NADP parameter value entered into at least one of the input fields of the NADP page.

17. An aircraft, comprising:

at least one display device within the aircraft;

a flight management system (FMS);

at least one user interface; and processor circuitry forming at least one processor communicatively coupled to the at least one display device, the FMS, and the at least one user interface, the at least one processor arranged to operate by:

displaying, prior to take-off while the aircraft is on the ground, at least one noise abatement departure procedure (NADP) page, wherein the NADP page comprises:

a page title indicating the NADP page includes NADP-related parameters, wherein the title includes at least the term NADP or noise abatement, an NADP selection section simultaneously displaying multiple selectable activators including an NADP1 activator, an NADP2 activator, and a custom NADP activator selectable by a user, wherein the NADP page comprises a combination of elevation section, a thrust section, and a speed section depending on which NADP activator is selected, wherein the NADP page is arranged with labeled input fields stating which parameter is to be placed or displayed in the input fields so that:

when the NADP1 is selected, no speed section is provided and the elevation section displays an NADP start (NS) thrust reduction altitude input field and a NADP end (NE) altitude input field, and the thrust section displays an NADP N1 input field that provides alternatives of computed by the FMS, climb, and manual as a title of the input field in % N1, when the NADP2 is selected, the elevation section displays an NS NADP speed transition altitude input field and the NADP NE altitude input field, and the thrust section displays an NADP thrust at flaps up input field with the N1 input field that provides the same alternatives as for the NADP1 thrust section, and a speed section provides alternatives of manual and safety single engine speed (Vse) with an input field, when the custom NADP is selected, the elevation section displays an NS thrust reduction altitude input field and an NE climb speed transition altitude input field, and the thrust section displays an NADP thrust input field with the N1 input field that provides the same alternatives as for the NADP1 thrust section, and a speed section provides an NADP speed gear up input field with alternatives of manual and safety single engine speed (Vse), and loading NADP parameter values input into at least one of the input fields by a user as part of a customized NADP into the FMS to fly the aircraft automatically according to the customized NADP.

18. The aircraft of claim 17, wherein the processor is arranged to display a thrust page that displays thrust limits for multiple phases of a flight and comprises a display of an NADP thrust level selected by a user.

19. The aircraft of claim 18, wherein the display of thrust limits and NADP thrust level are arranged so that images of the thrust limits and NADP thrust level are changed to indicate multiple different NADP statuses including armed, active, and off.

20. The aircraft of claim 17, wherein a line on the thrust page separates a take-off mode thrust area and NADP thrust level area from a climb thrust level area and a cruise thrust level area on the thrust page.

* * * * *